Feb. 15, 1944.  J. P. BAGAN  2,342,032
SPIRAL CUTTER
Filed July 3, 1941  2 Sheets-Sheet 1

INVENTOR
JOHN PETER BAGAN
BY
ATTORNEY

Feb. 15, 1944. J. P. BAGAN 2,342,032
SPIRAL CUTTER
Filed July 3, 1941 2 Sheets-Sheet 2
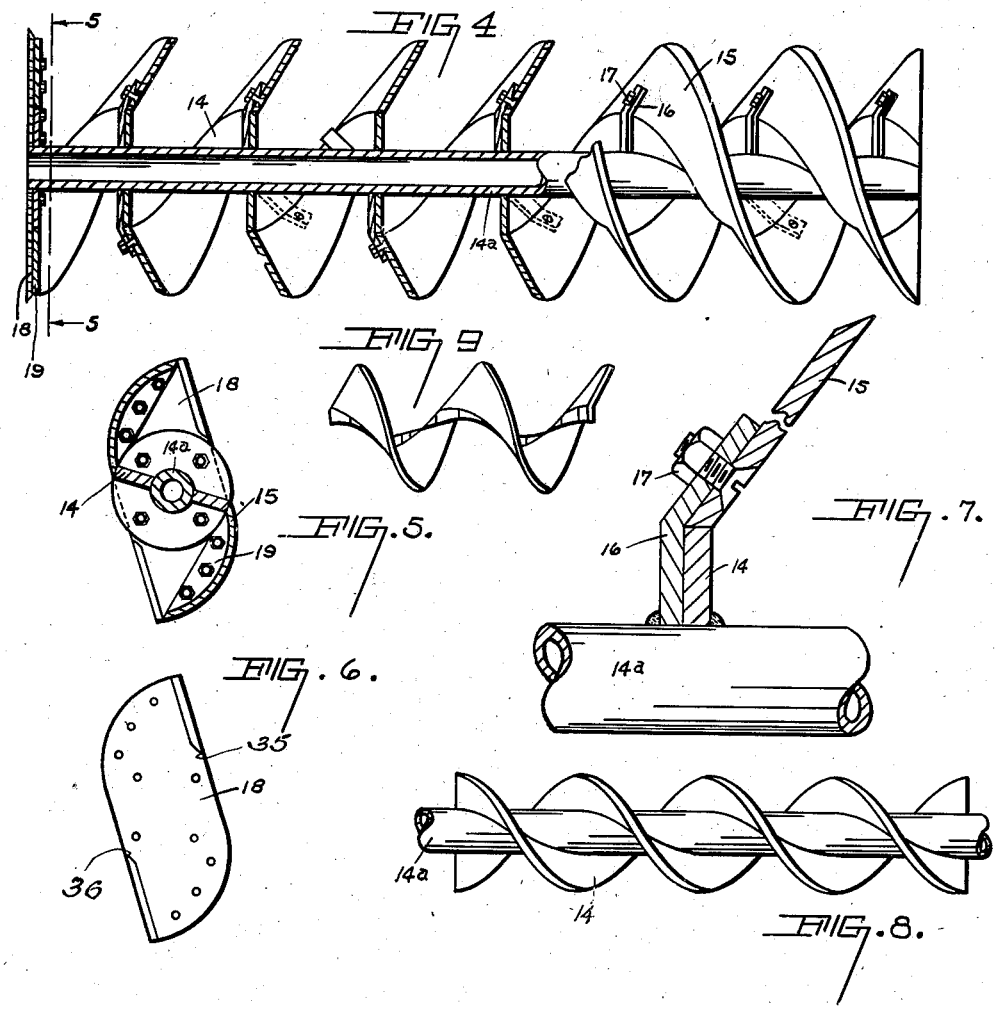
INVENTOR
JOHN PETER BAGAN
BY
ATTORNEY Patented Feb. 15, 1944

2,342,032

UNITED STATES PATENT OFFICE 2,342,032

SPIRAL CUTTER

John Peter Bagan, Portland, Oreg., assignor of one-third to Anthony R. Wanezek, Marshfield, Oreg.

Application July 3, 1941, Serial No. 400,949

8 Claims. (Cl. 97—219)

My invention relates particularly to spiral cutters, such, for example, as are incorporated in a soil tilling implement and has for its principal object the provision of a spiral cutter of this character comprising two spirally formed ribbons joined together, the outer ribbon being an oblique helicoid and the inner ribbon being a right helicoid. The inner ribbon serves more or less as a mold board and the outer ribbon serves as a cutter.

I deem it essential that each of said ribbons be a helicoidal structure presenting a surface a cross section of which is a straight line rather than a cupped surface.

Another object of my invention is to provide a spiral shaped cutting tool of this character comprising a plurality of ribbons in which the ribbons are arranged to make substantial angles with relation to each other to increase the structural strength and serviceability of said cutting tool.

A further object of my invention is to provide a cutting tool of this character upon a single shaft so that the said cutting tool may be conveniently taken apart for repair or replacement of the parts thereof.

A further object of my invention is to provide a cutting tool of this character in which the outer ribbon forming the cutter may be inclined to a plane normal to the axis of rotation of said cutter so that this plow will be substantially self-sharpening when said plow is used for plowing or other types of land cultivation.

Further and more detailed objects of my invention and the structure thereof are hereinafter disclosed in relation to the drawings, in which:

Fig. 4 is a view of said spiral cutter on a slightly enlarged scale, a portion being shown broken away and in section to illustrate details of my invention;

Fig. 5 is a sectional view taken on the line 5—5 in Fig. 4 to illustrate the details of the filler or end plates secured to one end of said spiral cutter;

Fig. 6 is an elevation of one of said end plates shown removed from the rotary spiral cutter;

Fig. 7 is an enlarged fore-shortened sectional view thru one of the flights of the rotary spiral cutter showing the manner in which the two separate ribbons are joined to each other and their angular relationship;

Fig. 8 is an elevation of the central ribbon forming a part of a rotary spiral cutter embodying my invention, shown secured to a hollow shaft;

Fig. 9 illustrates a modification of the cutter blade in which the right helicoidal portion and the oblique helicoidal portion are integral with each other.

Figure 1:
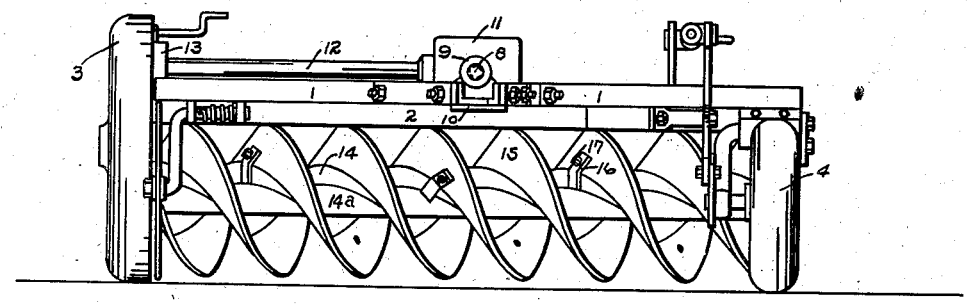
Fig. 1 is an elevation of a soil-tillage implement incorporating a cutter involving my invention.
Figure 2:
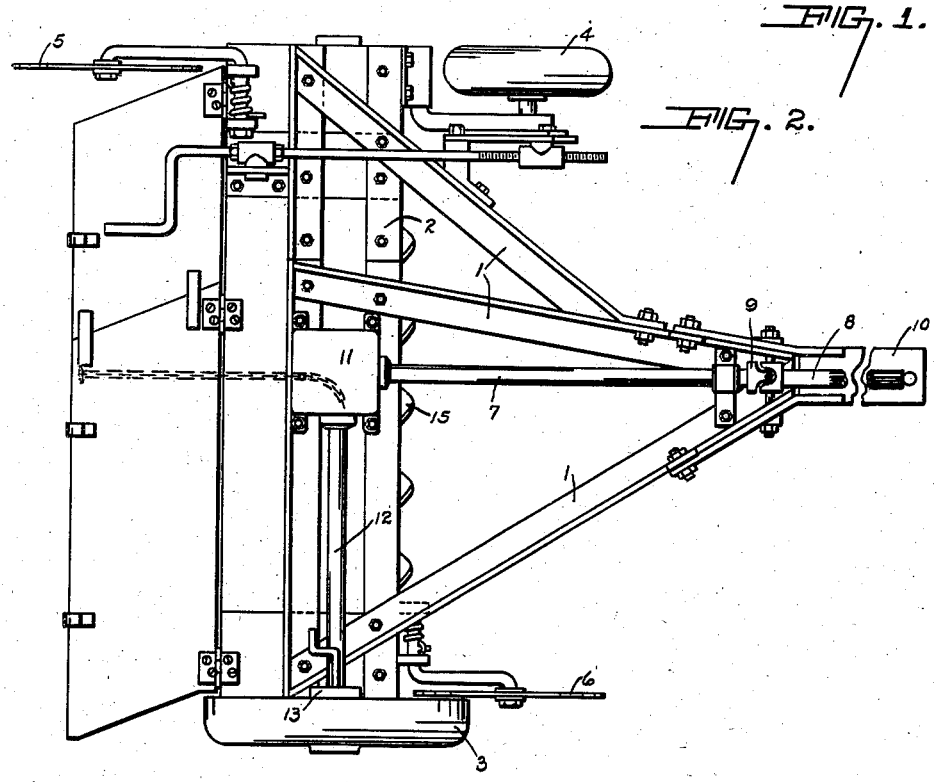
Fig. 2 is a plan view of said soil-tillage implement incorporating my improved rotary spiral cutter.

A soil tilling implement embodying my invention comprises a frame 1 extending more or less longitudinally and a transverse bolster 2. Said bolster is supported by a wheel 3 preferably made of metal at one side and a tired wheel 4 at the other side. Colters 5 and 6 are arranged at both sides of said bolster to prevent lateral movement due to the action of the spiral cutter. A drive shaft 7 extends longitudinally of the machine and is secured to a splined shaft 8 thru a universal joint 9. A draw bar connection 10 is formed at the forward end of frame members 1 and is adapted to be secured to the draw bar of a tractor, for example, and the splined shaft 8 is adapted to operatively engage the power take-off shaft of said tractor. Said tractor connections are not shown and it is to be understood that a soil tilling implement of this character may be separately powered or powered by any other device auxiliary thereto. A transmission 11 joins the rearward end of the drive shaft 7 with transverse shaft 12 and said transverse shaft drives the cutter thru power mechanism 13.

All of the details of said soil tilling implement play no active part in my invention and are illustrated to show how such spiral cutter may be utilized.

Further details of a rotary spiral plow may be obtained from an inspection of my co-pending applications for patent, Serial No. 366,278, filed November 19, 1940, entitled Rotary spiral plow, and Serial No. 332,220, filed April 29, 1940, entitled Spiral plows, and my abandoned application Serial No. 332,121, filed April 27, 1940, and entitled Spiral cutters, and reference is made thereto. Suffice it to say that the spiral cutter is journalled in the frame of said plow and is wheel supported and is power driven so that its peripheral speed is substantially greater than the speed at which the soil tilling implement is drawn and thus said spiral cutter bites into the soil and breaks the removed pieces into small bits.

Figure 3:
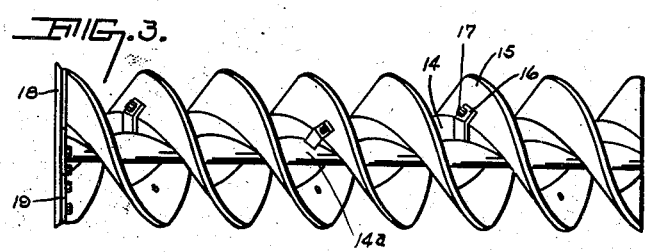
Fig. 3 is an elevation of said spiral cutter shown detached from the frame work of said soil-tillage implement.

The spiral cutter with which my invention is particularly concerned is carried upon a hollow shaft 14a and a right helicoid ribbon 14 is secured to said shaft preferably by welding, as is illustrated in Fig. 7. In the various figures I have shown a cutter comprising two helical flights formed one within the other because said form of spiral cutter works most efficiently in ordinary cases. To said helicoid ribbons 14 are secured, respectively, oblique helicoidal cutters 15. Said cutters 15 may be secured to the right helicoid bases 14 by clips 16, by bolts, rivets, welding or any other means which seem most practical. I prefer joining said ribbons by clips because the oblique helicoidal cutters wear and when they diminish in diameter to too great a degree, it is desirable that they be removed and replaced. Thus, if clips join said parts together they may be separated by removing bolts 17 and replacing the worn cutters with new cutters of the original diameter. Said cutters tend to move the earth laterally as well as to lift it up and cut it into small pieces. It is desirable, therefore, that on the end of the cutter which faces uncultivated land in cutting a furrow, that end cutters or plates 18 be secured. I preferably also bolt filler members 19 at said ends, fastening said filler members directly to the ends of the spiral cutters 15 and then bolting the end cutters or plates 18 directly to the filler members so that the end cutters or plates can be removed when they are worn and likewise permit said oblique helicoidal cutters to be removed therefrom for repair or replacement. As will be seen in Figs. 3, 4, 5 and 6, the end cutter blade 18 lies in a plane perpendicular to the axis of the spiral blade 15 and has opposite parallel straight edges 35 and 36. The maximum dimension of the cutter blade is substantially equal to the outer diameter of the spiral blade 15 and the width of the blade between the parallel edges 35 and 36 is less than half the outer diameter of the spiral blade. The edges 35 and 36 are sharpened to cutting edges from the opposite extremities thereof to a distance substantially equal to the radial width of the spiral blade.

I do not feel that the angle which the oblique helicoidal cutters make with the right helicoid is too critical and said angle, that is, the angle of the cross sections of the oblique and right helicoids may be varied between 10 degrees and 45 degrees, but I have found that I have greater success when said angle is somewhere in the neighborhood of 30 degrees. The oblique helicoidal cutters preferably are made of relatively tough, hard steel such as plow-disc steel or other alloyed or carbon steel, while the inner right helicoidal ribbon-like bases therefor may be made of softer metal and metal which may be more easily worked. The oblique helicoidal cutters slice thru the earth with a shearing cut and lift the earth up. The right helicoidal bases therefor serve as mold boards to aid in the overturning of said earth during the tilling operation, to prevent the packing of the plowed soil about said blades and to give strength and support to the oblique helicoidal cutters secured thereto.

The right helicoidal portion and the oblique helicoidal portion of the cutter may be formed separately and joined as described above or integral with each other as illustrated in Fig. 9.

I claim:

1. A spirally shaped cutter blade comprising an inner substantially right helicoidal member and an outer oblique helicoidal member of uniform thickness, said members having a common axis and equal pitch and the outer edge of the inner member being secured to the inner edge of the outer member, the line of intersection of a surface of the outer member with a plane through the axis making an angle with the line of intersection of the contiguous surface of the inner member with said plane of from 10° to 45° and the outer edge of the outer member having a soil cutting edge throughout its entire length.

2. A spirally shaped cutter blade as defined in claim 1 in which the inner edge of the inner helicoidal member surrounds and is attached to a cylindrical shaft.

3. A spirally shaped cutter blade as defined in claim 1 in which the lines of intersection of corresponding surfaces of the inner and outer members with a plane through the axis make an angle of about 30°.

4. A tillage implement comprising a spirally shaped cutter blade and a flat end cutter blade secured to and covering an end of said spiral blade and lying in a plane perpendicular to the axis of said spiral blade, said end cutter blade having at least two substantially parallel straight edges, the width of said end cutter blade between said parallel edges being not more than half the outer diameter of the spiral blade and the maximum dimension of said end cutter blade being substantially equal to the outer diameter of said spiral blade.

5. A tillage implement as defined in claim 4 in which there are at least two spirally shaped cutter blades of the same diameter and pitch and equally spaced from each other on a common axis and the end cutter blade is secured to and covers the adjacent ends of said spiral blades.

6. A tillage implement as defined in claim 4 in which the spirally shaped cutter blade consists of an inner substantially right helicoidal member and an outer oblique helicoidal member having a common axis and equal pitch and the outer edge of the inner helicoidal member is secured to the inner edge of the outer helicoidal member and the lines of intersection of said two helicoidal members with a plane through the axis make an angle with each other within the range from 10° to 45°.

7. A tillage implement as defined in claim 4 in which the parallel edges of the end cutter blade are sharpened to cutting edges from the opposite extremities thereof each for a distance substantially equal to the radial width of the spiral cutter blade.

8. A tillage implement as defined in claim 4 in which a filler member is secured to both the spiral cutter blade and the end cutter blade.

JOHN PETER BAGAN.